United States Patent Office 3,243,469
Patented Mar. 29, 1966

3,243,469
PRODUCTION OF 2,6-DIMETHYL-NAPHTHALENE
Abraham Schneider, 110 Harrogate Road,
Overbrook Hills, Pa.
No Drawing. Filed Aug. 10, 1962, Ser. No. 216,027
16 Claims. (Cl. 260—668)

This application is a continuation-in-part of my co-pending application Serial No. 69,798, filed November 17, 1960, and now abandoned.

This invention relates to the isomerization of dicyclic naphthenes having twelve carbon atoms to produce 2,6-dimethyldecalin. The invention further embraces the conversion of the 2,6-dimethyldecalin into 2,6-dimethylnaphthalene.

Naphthalene dicarboxylic acid in which the carboxyl groups are located at the 2,6-positions is a highly desirable article of commerce, particularly in that it can be used for making polyester type resins which have outstandingly good properties for certain applications. This dicarboxylic acid can be obtained by liquid phase oxidation of 2,6-dimethylnaphthalene in several ways. One known procedure involves the use of molecular oxygen (e.g., air) at temperatures in the range of 100–250° C. while utilizing a catalyst system comprising a heavy metal oxidation catalyst and bromine or a bromine compound. This type of oxidation process has been described in Saffer et al. United States Patent No. 2,833,816. By way of example, 2,6-dimethylnaphthalene can be converted to the corresponding diacid by contacting an acetic acid solution of the dimethylnaphthalene containing a cobalt acetate-ammonium bromide co-catalyst with molecular oxygen at a temperature in the range of 110–135° C.

A particularly suitable procedure for converting 2,6-dimethylnaphthalene to the corresponding naphthalene-2,6-dicarboxylic acid involves the use of nitrogen dioxide ($NO_2$) in combination with selenium. The procedure involves dissolving the 2,6-dimethylnaphthalene in an inert solvent such as trichlorobenzene, adding a small amount of selenium to the mixture and contacting the mixture in liquid phase with gaseous $NO_2$ at a temperature above 140° C., preferably in the range of 180–230° C. This procedure is capable of producing the 2,6-diacid in a yield generally in excess of 80% of the theoretical.

For commercial practice a difficulty in producing 2,6-naphthalene dicarboxylic acid lies in finding a suitable source of the 2,6-dimethylnaphthalene isomer. This compound occurs in coal tar and cracked petroleum fractions of appropriate boiling range but only in low proportion, since it is associated with the various other dimethylnaphthalene isomers, monocyclic aromatics and non-aromatic hydrocarbons. A concentrate of the dimethylnaphthalene isomers can be obtained by solvent extraction of the fraction with an aromatic-selective solvent such as furfural, but the 2,6-isomer is still only a minor constituent of the concentrate. Attempts to isomerize the other isomers, particularly those in which both methyl groups are positioned on the same ring, to produce the 2,6-isomers have not been successful.

I have now discovered that dicyclic naphthenes having twelve carbon atoms can be readily isomerized to an equilibrium mixture of dimethyldecalins in which the 2,6-dimethyldecalin occurs in relatively high proportion. The 2,6-isomers can be separated in any suitable manner, particularly by fractional crystallization, from the other isomers and the latter can be re-equilibrated by isomerization to yield more of the 2,6-isomer. The resulting 2,6-dimethyldecalin can then be dehydrogenated to obtain 2,6-dimethylnaphthalene which can be used to produce the 2,6-dicarboxylic acid.

According to the invention, any dicyclic naphthene having twelve carbon atoms or any mixture of such dicyclic naphthenes is reacted at a temperature in the range of $-10°$ C. to 60° C. in the presence of a catalyst system comprising an aluminum halide and hydrogen halide. The catalyst can comprise the combination of $AlBr_3=HBr$ or $AlCl_3=HCl$, and preferably is in the form of a complex with hydrocarbon as hereinafter described. Contact of the $C_{12}$ dicyclic naphthene with the catalyst effects an isomerization whereby an equilibrated mixture of dimethyldecalins is formed containing of the order of 20–25% of 2,6-dimethyldecalin. After removal of the catalyst, 2,6-dimethyldecalin can be separated from the equilibrated mixture by fractional crystallization at a temperature below $-10°$ C. The other isomers can be recycled to the isomerization step for further equilibration in admixture with an additional amount of the starting $C_{12}$ naphthene. This procedure results in essentially all of the original dicyclic naphthene being converted to 2,6-dimethyldecalin.

The present process is applicable to the conversion of any $C_{12}$ dicyclic naphthene regardless of its precise structure. The naphthene rings can be either condensed or non-condensed, and any alkyl substituent or substituents can be included that will result in the naphthene having twelve carbon atoms. The following are examples of suitable starting dicyclic naphthenes: dimethyldecalins (other than the 2,6-isomers); ethyldecalins; trimethylhydrindanes; ethylmethylhydrindanes; propylhydrindanes; bicyclohexyl; dimethylbicyclopentyls; ethylbicycolopentyls; 1,2-bicyclopentylethane; cyclopentylmethylcyclopentylmethanes; etc. Means for obtaining such starting materials include separation from suitable petroleum fractions, hydrogenation of coal tar fractions and dimerization of methylcyclopentane and/or cyclohexane. A particularly suitable starting material is bicyclohexyl, since it can readily be obtained by dimerizing benzene to form biphenyl which is then hydrogenated to bicyclohexyl.

The preferred procedure for carrying out the process involves contacting the $C_{12}$ dicyclic naphthene charge with an aluminum halide catalyst complex, hereinafter described, at a temperature in the range of 0–30° C. and in the absence of any added solvent. A sufficient time of contact is allowed to convert at least most of the charge hydrocarbon to the equilibrium mixture of dimethyldecalins and preferably to convert substantially all of it to such mixture. The catalyst is then separated from the hydrocarbon product and the latter is cooled to a temperature sufficiently low to cause fractional crystallization of the 2,6-isomer. The non-crystallized dimethyldecalins are separated from the crystalline product and preferably are recycled to the reaction zone for further conversion to 2,6-dimethyldecalin.

In another embodiment of the process the $C_{12}$ dicyclic naphthene charge is diluted with a $C_7$–$C_9$ monocyclic naphthene in a weight proportion of 30–90 parts of the dicyclic naphthene to 10–70 parts of the monocyclic naphthene. The mixture is then contacted with the aluminum halide catalyst to effect isomerization and form an equilibrium mixture of dimethyldecalins together with the monocyclic naphthene which remains substantially unreacted. After removal of the catalyst the 2,6-dimethyldecalin can be separated by fractional crystallization, with the $C_7$–$C_9$ naphthene serving as solvent for the other isomers. The other isomers, dissolved in the solvent, can be recycled to the isomerization step for further equilibration. The use of the $C_7$–$C_9$ naphthene is particularly advantageous when reaction temperatures above 30° C. are used, since monocyclic naphthenes of this molecular weight range tend to suppress undesirable cracking reactions that otherwise may occur at such higher temperature and result in progressive deactivation of the catalyst.

In the last-mentioned embodiment, any monocyclic naphthene having 7 to 9 carbon atoms can be used, for example, methylcyclohexane, dimethylcyclopentane, dimethylcyclohexane, ethylcyclopentane, propylcyclopentane, methylethylcyclohexane, isobutylcyclopentane and the like. The monocyclic naphthene remains substantially unchanged in the system except for equilibrating to a mixture of naphthene isomers; and after the 2,6-isomerization product has been selectively crystallized from it, the other isomers and the monocyclic naphthene solvent can be recycled to the isomerization zone.

An aluminum halide catalyst obtained by combining $AlCl_3$ with HCl or $AlBr_3$ with HBr is used to effect the isomerization reaction of the present process. With either aluminum halide the catalyst preferably is a liquid complex obtained by reacting the aluminum halide and hydrogen halide in the presence of one or more paraffin hydrocarbons having at least seven and more preferably at least eight carbon atoms. When $AlCl_3$ is used it is preferable to use paraffin hydrocarbons which have at least nine carbon atoms. This complex type of catalyst is insoluble in the reaction mixture, and the activity of the catalyst depends upon having at least a small amount of uncomplexed $AlCl_3$ or $AlBr_3$ present therein. When the aluminum halide is $AlCl_3$, it is also desirable to maintain a relatively high partial pressure of HCl, such as 100–500 p.s.i., in the reaction zone to increase catalytic activity. With $AlBr_3$ a high partial pressure of HBr is not needed and high activity is obtained as long as there is a slight partial pressure of HBr. The catalyst complex is a colored mobile liquid and typically is bright orange-yellow when $AlBr_3$ is used and brown when the aluminum halide is $AlCl_3$. In preparing the complex any paraffin hydrocarbon or mixture of such paraffins having seven or more carbon atoms can be used, but it is desirable to use a branched paraffin, e.g., one having at least two branches, in order to reduce the time for preparing the complex and it is particularly preferred that such isoparaffins have at least eight carbon atoms per molecule. The proportion of catalyst complex to $C_{12}$ dicyclic naphthene charged is not critical but it is generally desirable to employ a weight ratio of complex to hydrocarbon of at least 1:10 and more preferably at least 1:1. A slow degradation of the catalyst generally will occur over a course of time, particularly when $AlBr_3$ is used to make the catalyst, but the addition of a small amount of fresh aluminum halide from time to time will reactivate the catalyst. Also a portion or all of the catalyst complex can be replaced from time to time by fresh catalyst complex to maintain catalytic activity.

Preparation of the catalyst complex comprises dissolving or suspending the aluminum halide in the paraffin hydrocarbon and passing the hydrogen halide into the mixture. This can be done at room temperature, although the use of an elevated temperature such as 50–100° C. generally is desirable to increase the rate of reaction. For best results at least five moles of the paraffin per mole of $AlCl_3$ or $AlBr_3$ should be employed. Under these conditions some of the paraffin evidently breaks into fragments, yielding a $C_4$ fragment which becomes the hydrocarbon portion of the complex. In the case of $AlBr_3$, as the reaction proceeds the mixture becomes milky and the orange-yellow liquid complex then precipitates from the hydrocarbon phase. Addition of HBr is continued until the milky appearance has disappeared. For obtaining the most active catalyst complex the addition of HBr should be stopped at this point. When $AlCl_3$ is used to make the catalyst, such milky appearance does not appear as the HCl is added. Instead the particles of $AlCl_3$ in suspension in the hydrocarbon merely become converted to the liquid complex. The addition of HCl is stopped before all of the $AlCl_3$ reacts so that the complex formed will contain some $AlCl_3$ particles suspended therein. The resulting complexes made with either $AlCl_3$ or $AlBr_3$ are relatively stable materials having high catalytic activity.

When the aluminum halide is $AlBr_3$, the catalyst can also be used with the $AlBr_3$ dissolved in the hydrocarbon reactant so that the reaction mixture is homogeneous. When using this type of catalyst system, the $AlBr_3$ is dissolved in the dicyclic naphthene charge to the extent of 5–200% by weight on the hydrocarbon and HBr is pressured into the mixture in amount of at least 0.25% by weight of the hydrocarbon. The resulting reaction mixture remains homogeneous as the reaction occurs. With $AlCl_3$ a homogeneous system cannot be used since $AlCl_3$ is essentially insoluble in hydrocarbons.

The present process is carried out by intimately contacting the aluminum halide catalyst with the hydrocarbon reactant at a temperature within the range of —10° C. to 60° C. The rate of reaction and hence the time required to complete the reaction depends upon the temperature selected within this range and also upon the ratio of hydrocarbon to catalyst employed. In some circumstances essentially complete isomerization may be achieved in 5 to 10 minutes, while in other cases this may require as long as 5 hours. The composition of the dimethyldecalins formed typically is as follows:

| | Percent |
|---|---|
| 2,6-isomer | 23 |
| 2,7-isomer | 15 |
| 1,6+1,7+1,3-isomers | 20 |
| 2,3+1,4-isomers | 6 |
| Other isomers | 36 |

The isomers listed as 'other isomers" appear to be gem compounds with methyl substitution at the bridge carbons, inasmuch as that they cannot be dehydrogenated to form aromatics.

After the 2,6-isomer has been separated from the above-described equilibration product, the remaining isomers can be isomerized in the same manner again to form an equilibrated product containing essentially the same proportion of the desired 2,6-isomer.

Among the position isomers tabulated above, there are numerous possible geometric isomers. In fact the total possible number of isomers of dimethyldecalin is 128. Hence it would heretofore have seemed most unlikely that an equilibrium mixture of dimethyldecalins, such as is produced in the present process, could be made to undergo a selective crystallization whereby only a single isomer selectively precipitates therefrom. Nevertheless, I have now discovered that this result can indeed be achieved when the mixture is cooled to a temperature sufficiently below —10° C. Fortunately the isomer which selectively crystallizes has the 2,6-configuration, and it is only one of the several possible geometric isomers of this particular configuration. Its structure can be represented by the following formula:

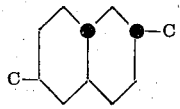

wherein the heavy dots represent hydrogen atoms projecting from the molecule towards the observer and the methyl groups are equatorial. Specifically this compound is syn-2-methyl-anti-6-methyl-trans-decalin, and when pure it has a sharp melting point of 45° C.

The selective crystallization for obtaining the foregoing isomer generally should be carried out at a temperature between —10° C. and —70° C. when the mixture contains no $C_7$–$C_9$ naphthene such as methylcyclohexane. When a solvent such as this is present in the mixture, lower crystallization temperatures, e.g., —80° C. to —100° C., may be required. The yield of precipitate increases as the temperature decreases. However too low a crystallization temperature should be avoided, as it will cause 2,7-dimethyldecalin to crystallize also. In cases where it is desired to recover the 2,7-dimethyldecalin also, the crystallization can be carried out in two steps to obtain highly pure 2,6-dimethyldecalin first and then by lowering the temperature to precipitate 2,7-dimethyldecalin in admixture with the 2,6-isomer not crystallized in the first step.

Dehydrogenation of the separated 2,6-dimethyldecalin produces the desired 2,6-dimethylnaphthalene. This step can readily be carried out by passing the 2,6-dimethyldecalin over a conventional dehydrogenation catalyst at a temperature in the range of 375–450° C., more preferably 400–425° C. A platinum catalyst is preferred for this purpose, such as platinum distended on alumina or on activated carbon. In order to minimize coking of the catalyst it is desirable to recycle hydrogen to the dehydrogenation zone and operate at a pressure in the range of 100–500 p.s.i.g. Under proper conditions the yield of 2,6-dimethylnaphthalene typically is of the order of 95–98%.

The following examples illustrate the invention more specifically:

*Example I*

The present example illustrates the use of a homogeneous catalyst system in which the AlBr$_3$-HBr is dissolved in the hydrocarbon material. The dicyclic naphthene charge was a mixture of 2,3-dimethyldecalins which contained at least five of the possible geometric 2,3-isomers. This material was admixed with an equal weight amount of methylcyclohexane and 7.75 g. of the mixture were charged to a shaking-type autoclave. 7.76 g. of AlBr$_3$ were added thereto and hydrogen was pressured into the reactor to a pressure of 100 p.s.i.g. The mixture was cooled to 0° C. and HBr was added in amount of 0.97 g., causing the pressure to rise to 125 p.s.i.g. The mixture was warmed to room temperature and hydrogen was added until the total pressure was 303 p.s.i.g. The mixture was then agitated at about 27° C. Isomerization occurred but the mixture was not completely equilibrated in 90 minutes. Upon shaking for a total time of 235 minutes, the mixture had become completely equilibrated. The product was worked up by water washing to remove the catalyst. A portion of the resulting reaction mixture was cooled to —80° C. and crystals were formed which were composed essentially of 2,6-dimethyldecalin.

Another portion of the reaction mixture was dehydrogenated by passing it along with hydrogen over a platinum-on-alumina reforming catalyst at a temperature of 400–425° C. Analysis of the product showed the following weight proportions among the dicyclic compounds:

| | Percent |
|---|---|
| 2,6-dimethylnaphthalene | 23 |
| 2,7-dimethylnaphthalene | 15 |
| 1,6+1,7+1,3-dimethylnaphthalenes | 20 |
| 2,3+1,4-dimthylnaphthalenes | 6 |
| Non-dehydrogenated material | 36 |

The non-dehydrogenated material was gem dimethyldecalins. From the data it can be ascertained that, of the dimethylnaphthalenes produced, about 36% was the desired 2,6-isomer. The non-dehydrogenated material could be separated from the naphthalenes by distillation and recycled to the isomerization step.

*Example II*

The present example illustrates the use of the previously described complex as catalyst. The complex was formed by saturating a mixture composed of 4.55 g. of AlBr$_3$ and 5.45 g. of dimethylhexanes with HBr at room temperature and atmospheric pressure and then raising the temperature to 50° C. and bubbling HBr into it for 30 minutes. A light yellow complex formed as a lower layer, and it was separated from the hydrocarbon phase and then washed twice with 9 ml. portions of methylcyclohexane. The yield of complex was 4.93 g. This was added to a shaking-type autoclave, 7.75 g. of a 50:50 mixture of 2,3-dimethyldecalins and methylcyclohexane was added and the mixture was shaken at about 28° C. Isomerization occurred rapidly and in less than 20 minutes the mixture had become completely equilibrated. Vapor phase chromatography showed that the reaction product was exactly the same as that obtained in Example I. Substantially all of the isomerizate boiled below the starting mixture of isomeric 2,3-dimethyldecalins. The isomerizate all boiled in the range of 215–223° C., while most of it distilled over at 215.5–215.7° C. Again it was found that white crystals of 2,6-dimethyldecalin were obtained when the product was cooled to —80° C.

*Example III*

In this example, a complex again was used as the catalyst, the starting dicyclic naphthene was bicyclohexyl and no monocyclic naphthene was employed. The catalyst complex was prepared in similar manner to that described in Example II, using 9.85 g. of AlBr$_3$ and 10.95 g. of mixed dimethylhexanes to obtain 13.45 g. of the complex. The latter was mixed with 14.35 g. of bicyclohexyl at 25° C. for 70 minutes. The reaction product obtained was essentially the same as in the two preceding examples. 6.65 g. of the product were mixed with 7.6 g. of n-pentane, and the mixture was cooled to —80° C. and filtered. The crystals obtained were dissolved at room temperature in 26 ml. of methanol, the solution was cooled to 0° C. and filtered and the resulting crystals were dried. Pure 2,6-dimethyldecalin was obtained in a yield of 15.2% of the reaction product processed in this way. This compound was a white crystalline material at room temperature and melted at 45° C. The crystalline material was dehydrogenated at 425° C. over platinum on activated alumina and also over platinum on carbon, and in each case the direct product of dehydrogenation was essentially pure 2,6-dimethylnaphthalene as shown by vapor phase chromatography and infrared analysis.

*Example IV*

A catalytic gas oil having a boiling range of 440–540° F. was extracted with furfural to produce an aromatic extract which contained 0.37% by weight of sulfur. The aromatic extract was desulfurized by passing a mixture of it with hydrogen through a cobalt molybdate catalyst at 850° F. and a pressure of 500 p.s.i.g. The desulfurized material was distilled to obtain a fraction boiling in the range of 480–508° F. and composed mainly of dimethylnaphthalenes. This fraction was hydrogenated by means of a platinum-on-alumina catalyst using a hydrogen pressure of 1000 p.s.i.g. and a temperature of 650° F. This reduced the aromatic content to 0.5% by weight. The remaining aromatics were then removed by selective adsorption on silica gel. The saturate product, as shown by infrared, was composed mainly of dimethyldecalins, and was used as charge to an isomerization zone.

An isomerization catalyst was prepared by reacting 52 parts by weight of AlCl$_3$, 3 parts of HCl and 45 parts of a heavy alkylate composed of isoparaffins of the C$_9$–C$_{12}$ range at a temperature of 125° F. for 3 hours. The isomerization reaction was carried out with the thus prepared catalyst complex in a Mixco countercurrent contactor having ten contacting stages and a rotor operated at a speed of 1000 r.p.m. The catalyst complex was continuously fed into the top of the contactor at a rate of 2.0 gal. per hours and it passed downwardly countercurrent to the dimethyldecalin charge which was continuously fed into the bottom at a rate of 0.45 gal. per hours. A 2 p.s.i. partial pressure of HCl was maintained in the contactor and the temperature of operation was about 75° F. Compositions of the hydrocarbon charge and the reaction product are shown in the following tabulation.

|  | Composition, wt. percent | |
|---|---|---|
|  | Charge | Product |
| Decalin | 1 | 1 |
| 2-Methyldecalin | 4 | 5 |
| 1-Methyldecalin | 2 | 1 |
| 2-Ethyldecalin | 4 | 4 |
| 1-Ethyldecalin | 1 | |
| 2,6-Dimethyldecalin | 12 | 23 |
| 2,7-Dimethyldecalin | 11 | 21 |
| 1,6+1,7+1,3-Dimethyldecalins | 40 | 22 |
| 2,3+1,4+1,5-Dimethyldecalins | 11 | 10 |
| Gem isomers | 14 | 13 |

The data given show that both the 2,6- and 2,7-isomers were produced at the expense of other isomers, particularly the 1,6+1,7+1,3 group. The resulting equilibrated product was diluted with twice its volume of methylethylketone as solvent, the mixture was cooled to −60° C. and crystalline 2,6-dimethyldecalin was recovered by filtration. This resulted in a recovery of 55% of the 2,6-isomer in a purity of about 95%. The filtrate, after removal of solvent, was then re-isomerized in the same manner as described above. Compositions of the filtrate and of the re-isomerization product are shown in the following tabulation.

|  | Composition, wt. percent | |
|---|---|---|
|  | Filtrate | Re-isomerization Product |
| Decalin | 1 | 1 |
| 2-Methyldecalin | 6 | 6 |
| 1-Methyldecalin | 1 | 1 |
| 2-Ethyldecalin | 5 | 3 |
| 1-Ethyldecalin | | |
| 2,6-Dimethyldecalin | 12 | 21 |
| 2,7-Dimethyldecalin | 24 | 19 |
| 1,6+1,7+1,3-Dimethyldecalins | 25 | 22 |
| 2,3+1,4+1,5-Dimethyldecalins | 11 | 12 |
| Gem isomers | 15 | 15 |

Comparison of the compositions of the first isomerization product and of the re-isomerization product shows they were substantially the same. It is therefore apparent that by continuously recycling the filtrate to the isomerization zone, substantially all of the dimethyldecalins could be converted to the 2,6-isomer. For a continuous operation with recycling, the charge material should be fractionated more efficiently than was done in the present example in order to eliminate the methyldecalins, as otherwise they would build up in the system. Elimination of the ethyldecalins would not be necessary, since they equilibrate with the dimethyldecalins so that the percentage thereof would not exceed the small amount shown above even for continuous recycling.

A sample of the 2,6-dimethyldecalin produced as described above but having a purity of 97% as obtained from the crystallization step was dehydrogenated at 385° C. and atmospheric pressure using a platinum-on-alumina catalyst. Analysis of the dehydrogenated product showed the following composition by weight: 96.8% 2,6-dimethylnaphthalene, 1.8% of other dimethylnaphthalenes and 1.4% methylnaphthalene.

I claim:

1. Method of preparing 2,6-dimethylnaphthalene which comprises contacting dicyclic naphthene having 12 carbon atoms, other than 2,6-dimethyldecalin, at a temperature in the range of −10° C. to 60° C. with a catalyst selected from the group consisting of $AlBr_3$-HBr catalysts and $AlCl_3$-HCl catalysts, whereby isomerization of said dicyclic naphthene occurs with the formation of 2,6-dimethyldecalin, cooling the reaction product to a temperature at which 2,6-dimethyldecalin selectively crystallizes, separating crystallized 2,6-dimethyldecalin from noncrystallized product and dehydrogenating the 2,6-dimethyldecalin to obtain 2,6-dimethylnaphthalene in high purity.

2. Method according to claim 1 wherein said catalyst is a pre-formed liquid complex obtained by reacting $AlCl_3$, HCl and paraffin hydrocarbon having at least seven carbon atoms.

3. Method according to claim 1 wherein said catalyst is a pre-formed liquid complex obtained by reacting $AlBr_3$, HBr and paraffin hydrocarbon having at least seven carbon atoms.

4. Method according to claim 1 wherein the temperature is in the range of 0–30° C.

5. Method according to claim 1 wherein said dicyclic naphthene is a mixture of dimethyldecalins including at least one such decalin having both methyl groups attached to the same naphthene ring.

6. Method according to claim 5 wherein said catalyst is a liquid complex obtained by reacting $AlBr_3$, HBr and isoparaffin hydrocarbon having at least eight carbon atoms.

7. Method according to claim 5 wherein said catalyst is a liquid complex obtained by reacting $AlCl_3$, HCl and isoparaffin having at least nine carbon atoms.

8. Method according to claim 1 wherein the reaction mixture exclusive of the catalyst comprises 30–90 parts by weight of said dicyclic napthene and 10–70 parts by weight of monocyclic naphthene of the $C_7$–$C_9$ range.

9. Method according to claim 8 wherein the temperature is in the range of 30–60° C.

10. In a process for producing 2,6-dimethylnaphthalene in which process dicyclic naphthene having 12 carbon atoms, other than 2,6-dimethyldecalin, is isomerized to form a multi-component mixture of dimethyldecalin isomers, the steps of cooling said mixture to a temperature in the range of −10° C. to −70° C. to obtain a crystalline precipitate, separating the precipitate from noncrystallized isomers, whereby 2,6-dimethyldecalin of high purity is obtained and dehydrogenating the 2,6-dimethyldecalin to obtain 2,6-dimethylnaphthalene in high purity.

11. Method of preparing 2,6-dimethylnaphthalene in high purity which comprises hydrogenating mixed dimethylnaphthalenes derived from catalytic gas oil to form mixed dimethyldecalins, contacting the dimethyldecalins at a temperature in the range of −10° C. to 60° C. with a catalyst selected from the group consisting of $AlBr_3$-HBr catalysts and $AlCl_3$-HCl catalysts to effect equilibration of the dimethyldecalins, cooling the equilibrated mixture to a temperature below −10° C. at which 2,6-dimethyldecalin selectively crystallizes from the mixture, separately recovering the crystalline 2,6-dimethyldecalin from noncrystallized product, and dehydrogenating the 2,6-dimethyldecalin to obtain 2,6-dimethylnaphthalene in high purity.

12. Method according to claim 11 wherein said catalyst is a pre-formed liquid complex obtained by reacting $AlCl_3$, HCl and paraffin hydrocarbon having at least seven carbon atoms.

13. Method according to claim 12 wherein the temperature is in the range of 0–30° C.

14. Method according to claim 11 wherein said catalyst is a pre-formed liquid complex obtained by reacting $AlBr_3$, HBr and paraffin hydrocarbon having at least seven carbon atoms.

15. Method according to claim 14 wherein the temperature is in the range of 0–30° C.

16. Method according to claim 1 wherein said noncrystallized product is recycled to the contacting step for conversion to 2,6-dimethyldecalin to increase the yield of 2,6-dimethylnaphthalene.

References Cited by the Examiner

UNITED STATES PATENTS

| | | | |
|---|---|---|---|
| 2,396,331 | 3/1946 | Marschner | 260—666 |
| 2,411,726 | 11/1946 | Holroyd et al. | 260—666 |
| 2,443,079 | 6/1948 | Otto | 260—667 |
| 2,833,832 | 5/1958 | Fox | 260—668 |
| 2,967,822 | 1/1961 | Moy et al. | 260—668 |

FOREIGN PATENTS 406,808  3/1934  Great Britain.

OTHER REFERENCES

Egloff, Physical Constants of Hydrocarbons, vol. II, pp. 199 and 255 relied on, Reinhold Pub. Corp., New York, 1940.

Levina et al., J. Gen. Chem. (U.S.S.R.), vol. 7, pp. 341–9, 1937, abstracted in Chemical Abstracts, vol. 31, column 4654, 1937.

Orchin et al., Isomerization of Bicyclohexyl, J. Am. Chem. Soc., vol. 68, pp. 2737–8 (1948).

DELBERT E. GANTZ, *Primary Examiner.*

ALPHONSO D. SULLIVAN, *Examiner.*

C. E. SPRESSER, *Assistant Examiner.*